United States Patent
Koepfer et al.

(10) Patent No.: US 11,542,285 B2
(45) Date of Patent: Jan. 3, 2023

(54) SILANE MIXTURES AND PROCESS FOR PREPARING SAME

(71) Applicant: Evonik Operations GmbH, Essen (DE)

(72) Inventors: Alexander Koepfer, Bernau im Schwarzwald (DE); Caren Roeben, Essen (DE); Andre Hasse, Juelich (DE); Frank Forster, Schoellkrippen (DE)

(73) Assignee: Evonik Operations GmbH, Essen (DE)

( * ) Notice: Subject to any disclaimer, the term of this patent is extended or adjusted under 35 U.S.C. 154(b) by 126 days.

(21) Appl. No.: 16/766,524

(22) PCT Filed: Nov. 16, 2018

(86) PCT No.: PCT/EP2018/081488
§ 371 (c)(1),
(2) Date: May 22, 2020

(87) PCT Pub. No.: WO2019/105759
PCT Pub. Date: Jun. 6, 2019

(65) Prior Publication Data
US 2020/0377530 A1   Dec. 3, 2020

(30) Foreign Application Priority Data

Nov. 28, 2017   (DE) .................... 10 2017 221 277.2

(51) Int. Cl.
*C07F 7/18* (2006.01)
*C08K 5/5419* (2006.01)

(52) U.S. Cl.
CPC .............. *C07F 7/18* (2013.01); *C08K 5/5419* (2013.01)

(58) Field of Classification Search
CPC ............. C07F 7/18; C07F 7/1804; C08K 9/06
See application file for complete search history.

(56) References Cited

U.S. PATENT DOCUMENTS

2003/0176396 A1* 9/2003 Shea ..................... A61Q 17/00
                                                   528/25
2005/0033002 A1   2/2005 Kishan et al.
2007/0135661 A1   6/2007 Kishan et al.

FOREIGN PATENT DOCUMENTS

| JP | 8-157696 A    | 6/1996  |
| JP | 2007-109415 A | 4/2007  |
| JP | 2016-69551 A  | 5/2016  |
| RU | 2 404 207 C2  | 11/2010 |

OTHER PUBLICATIONS

International Search Report dated Jan. 9, 2019 in PCT/EP2018/081488 filed on Nov. 16, 2018, 2 pages.
Burleigh et al., "Direct Synthesis of Periodic Mesoporous Organosilicas: Functional Incorporation by Co-condensation with Organosilanes", Journal of Physical Chemistry Part B: Condensed Matter, Materials, Surfaces, Interfaces & Biophysical, US, 2001, vol. 105, pp. 9935-9942, XP055535382.
U.S. Appl. No. 16/766,343, filed May 22, 2020, Koepfer, et al.
U.S. Appl. No. 16/766,462, filed May 22, 2020, Koepfer, et al.
Chinese Office Action dated Mar. 8, 2022 in Chinese Patent Application No. 201880078874.1 (submitting English translation only), 4 pages.
Belikov V.G. "Farmacevticheskaja himija". Moscow, 2007, 624 pages, p. 23; Dement'ev et al. "Issledovanie uprugogisterezisnyh i tehnologicheskih svojstv rezinovyh smesej, napolnennyh razlichnymi napolniteljami". Vestnik Kazanskogo tehnologicheskogo universiteta, 2006, No. 4, pp. 203-210 (with English translation).

* cited by examiner

*Primary Examiner* — Pancham Bakshi
(74) *Attorney, Agent, or Firm* — Oblon, McClelland, Maier & Neustadt, L.L.P.

(57) ABSTRACT

The invention relates to silane mixtures comprising a silane of the formula I

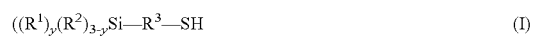

and a silane of the formula II

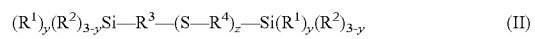

where the molar ratio of silane of the formula I to silane of the formula II is 20:80-85:15.

The silane mixture according to the invention can be prepared by mixing the silanes of the formula I and silanes of the formula II.

8 Claims, No Drawings

SILANE MIXTURES AND PROCESS FOR PREPARING SAME

The invention relates to silane mixtures and to processes for preparation thereof.

EP 0670347 and EP 0753549 disclose rubber mixtures comprising at least one crosslinker, a filler, optionally further rubber auxiliaries and at least one reinforcing additive of the formula $$R^1R^2R^3Si-X^1-(-S_x-Y-)_m-(-S_x-X^2-SiR^1R^2R^3)_n.$$

JP2012149189 discloses the silane of the formula $(R^1O)_rR^2_{(3-r)}Si-R^3-(S_mR^4)_n-S-R^5$ with $R^5=-C(=O)-R^6$
$R^6=C1\text{-}C20$.

In addition, EP 1375504 discloses silanes of the formula $$(R^1O)_{(3-P)}(R^2)_PSi-R^3-S_m-R^4-(S_n-R^4)_q-S_m-R^3-Si(R^2)_P(OR^1)_{(3-P)}.$$

WO 2005/059022 discloses rubber mixtures comprising a silane of the formula $[R^2R^3R^4Si-R^5-S-R^6-R^7-]R^1$.

Additionally known are rubber mixtures comprising a bifunctional silane and a further silane of the formula (Y)G(Z) (WO 2012/092062) and rubber mixtures comprising bistriethoxysilylpropyl polysulfide and bistriethoxysilylpropyl monosulfide (EP1085045).

EP 1928949 discloses a rubber mixture comprising the silanes $(H_5C_2)_3Si-(CH_2)_3-X-(CH_2)_6-S_2-(CH_2)_6-X-(CH_2)_3-Si(OC_2H_5)_3$ and/or $(H_5C_2O)_3Si-(CH_2)_3-X-(CH_2)_{10}-S_2-(CH_2)_6-X-(CH_2)_{10}-Si(OC_2H_5)_3$ and $(H_5C_2O)_3Si-(CH_2)_3-S_m-(CH_2)_3-Si(OC_2H_5)_3$.

It is an object of the present invention to provide silane mixtures having improved rolling resistance, improved reinforcement and improved abrasion in rubber mixtures compared to silanes known from the prior art.

The invention provides a silane mixture comprising a silane of the formula I $$(R^1)_y(R^2)_{3-y}Si-R^3-SH \quad (I)$$

and a silane of the formula II $$(R^1)_y(R^2)_{3-y}Si-R^3-(S-R^4)_z-Si(R^1)_y(R^2)_{3-y} \quad (II)$$

where $R^1$ are the same or different and are C1-C10-alkoxy groups, preferably methoxy or ethoxy groups, phenoxy group, C4-C10-cycloalkoxy groups or alkyl polyether group $-O-(R^5-O)_r-R^6$ where $R^5$ are the same or different and are a branched or unbranched, saturated or unsaturated, aliphatic, aromatic or mixed aliphatic/aromatic divalent C1-C30 hydrocarbon group, preferably $-CH_2-CH_2-$, r is an integer from 1 to 30, preferably 3 to 10, and $R^6$ is unsubstituted or substituted, branched or unbranched monovalent alkyl, alkenyl, aryl or aralkyl groups, preferably a $C_{13}H_{27}$-alkyl group, $R^2$ is the same or different and is C6-C20-aryl groups, preferably phenyl, C1-C10-alkyl groups, preferably methyl or ethyl, C2-C20-alkenyl group, C7-C20-aralkyl group or halogen, preferably Cl, $R^3$ are the same or different and are a branched or unbranched, saturated or unsaturated, aliphatic, aromatic or mixed aliphatic/aromatic divalent C1-C30 hydrocarbon group, preferably C1-C20, more preferably C1-C10, even more preferably C2-C7, especially preferably $CH_2CH_2$, $CH_2CH_2CH_2$ and $(CH_2)_8$, $R^4$ are the same or different and are a branched or unbranched, saturated or unsaturated, aliphatic, aromatic or mixed aliphatic/aromatic divalent C1-C30 hydrocarbon group, preferably C1-C20, more preferably C1-C10, even more preferably C2-C7, especially preferably $(CH_2)_6$, and y are the same or different and are 1, 2 or 3, z is 0, 1, 2 or 3, preferably 0, 1 or 2, and the molar ratio of silane of the formula I to silane of the formula II is 20:80-85:15, preferably 30:70-85:15, more preferably 40:60-85:15, most preferably 50:50-85:15.

Preferably, the silane mixture may comprise a silane of the formula I $$(R^1)_y(R^2)_{3-y}Si-R^3-SH \quad (I)$$

and a silane of the formula II $$(R^1)_y(R^2)_{3-y}Si-R^3-(S-R^4)_z-Si(R^1)_y(R^2)_{3-y} \quad (II)$$

where z is 0 or 2, more preferably 0, and $R^1$, $R^2$, $R^3$, $R^4$ and y have the same definition as described above.

The silane mixture according to the invention may comprise further additives or consist solely of silanes of the formula I and silanes of the formula II.

The silane mixture according to the invention may comprise oligomers that form as a result of hydrolysis and condensation of the silanes of the formula I and/or silanes of the formula II.

The silane mixture according to the invention may have been applied to a support, for example wax, polymer or carbon black. The silane mixture according to the invention may have been applied to a silica, in which case the binding may be physical or chemical.

$R^3$ and $R^4$ may independently be $-CH_2-$, $-CH_2CH_2-$, $-CH_2H_2CH_2-$, $-CH_2CH_2CH_2-$, $-CH(CH_3)-$, $-CH_2CH(CH_3)-$, $-CH(CH_3)CH_2-$, $-C(CH_3)_2-$, $-CH(C2H_5)-$, $-CH_2CH_2CH(CH_3)-$, $-CH(CH_3)CH_2CH_2-$, $-CH_2CH(CH_3)CH_2-$,
$-CH_2CH_2CH_2CH_2-$,
$-CH_2CH_2CH_2CH_2CH_2-$,
$-CH_2CH_2CH_2CH_2CH_2CH_2-$,
$-CH_2CH_2CH_2CH_2CH_2CH_2CH_2-$,
$-CH_2CH_2CH_2CH_2CH_2CH_2CH_2CH_2-$,
$-CH_2CH_2CH_2CH_2CH_2CH_2CH_2CH_2CH_2-$,
$-CH_2CH_2CH_2CH_2CH_2CH_2CH_2CH_2CH_2CH_2-$,
$-CH_2CH_2CH_2CH_2CH_2CH_2CH_2CH_2CH_2CH_2CH_2-$,
$-CH_2CH_2CH_2CH_2CH_2CH_2CH_2CH_2CH_2CH_2CH_2CH_2-$,
$-CH_2CH_2CH_2CH_2CH_2CH_2CH_2CH_2CH_2CH_2CH_2CH_2CH_2-$,
$-CH_2CH_2CH_2CH_2CH_2CH_2CH_2CH_2CH_2CH_2CH_2CH_2CH_2CH_2-$ or $R^1$ may preferably be methoxy or ethoxy.
Silanes of the formula I may preferably be:
$(EtO)_3Si-(CH_2)-SH$,
$(EtO)_3Si-(CH_2)_2-SH$,
or $(EtO)_3Si-(CH_2)_3-SH$,
Especially preferred is the silane of the formula I
$(EtO)_3Si-(CH_2)_3-SH$.
Silanes of the formula II may preferably be:
$(EtO)_3Si-CH_2-S-CH_2-S-CH_2-Si(OEt)_3$, (EtO)₃Si—(CH₂)₂—S—CH₂—S—(CH₂)₂—Si(OEt)₃,
(EtO)₃Si—(CH₂)₃—S—CH₂—S—(CH₂)₃—Si(OEt)₃,
(EtO)₃Si—CH₂—S—(CH₂)₂—S—CH₂—Si(OEt)₃,
(EtO)₃Si—(CH₂)₂—S—(CH₂)₂—S—(CH₂)₂—Si(OEt)₃,
(EtO)₃Si—(CH₂)₃—S—(CH₂)₂—S—(CH₂)₃—Si(OEt)₃,
(EtO)₃Si—CH₂—S—(CH₂)₃—S—CH₂—Si(OEt)₃,
(EtO)₃Si—(CH₂)₂—S—(CH₂)₃—S—(CH₂)₂—Si(OEt)₃,
(EtO)₃Si—(CH₂)₃—S—(CH₂)₃—S—(CH₂)₃—Si(OEt)₃,
(EtO)₃Si—CH₂—S—(CH₂)₄—S—CH₂—Si(OEt)₃,
(EtO)₃Si—(CH₂)₂—S—(CH₂)₄—S—(CH₂)₂—Si(OEt)₃,
(EtO)₃Si—(CH₂)₃—S—(CH₂)₄—S—(CH₂)₃—Si(OEt)₃,
(EtO)₃Si—CH₂—S—(CH₂)₅—S—CH₂—Si(OEt)₃,
(EtO)₃Si—(CH₂)₂—S—(CH₂)₅—S—(CH₂)₂—Si(OEt)₃,
(EtO)₃Si—(CH₂)₃—S—(CH₂)₅—S—(CH₂)₃—Si(OEt)₃,
(EtO)₃Si—CH₂—S—(CH₂)₆—S—CH₂—Si(OEt)₃,
(EtO)₃Si—(CH₂)₂—S—(CH₂)₆—S—(CH₂)₂—Si(OEt)₃,
(EtO)₃Si—(CH₂)₃—S—(CH₂)₆—S—(CH₂)₃—Si(OEt)₃,
(EtO)₃Si—(CH₂)—Si(OEt)₃,
(EtO)₃Si—(CH₂)₂—Si(OEt)₃,
(EtO)₃Si—(CH₂)₃—Si(OEt)₃,
(EtO)₃Si—(CH₂)₄—Si(OEt)₃,
(EtO)₃Si—(CH₂)₅—Si(OEt)₃,
(EtO)₃Si—(CH₂)₆—Si(OEt)₃,
(EtO)₃Si—(CH₂)₇—Si(OEt)₃,
(EtO)₃Si—(CH₂)₈—Si(OEt)₃,
(EtO)₃Si—(CH₂)₉—Si(OEt)₃,
(EtO)₃Si—(CH₂)₁₀—Si(OEt)₃,
(EtO)₃Si—(CH₂)—S—(CH₂)—Si(OEt)₃,
(EtO)₃Si—(CH₂)₂—S—(CH₂)₂Si(OEt)₃,
(EtO)₃Si—(CH₂)₃—S—(CH₂)₃Si(OEt)₃,
(EtO)₃Si—(CH₂)₄—S—(CH₂)₄Si(OEt)₃,
(EtO)₃Si—(CH₂)₅—S—(CH₂)₅Si(OEt)₃,
(EtO)₃Si—(CH₂)₆—S—(CH₂)₆Si(OEt)₃,
(EtO)₃Si—(CH₂)₇—S—(CH₂)₇Si(OEt)₃,
(EtO)₃Si—(CH₂)₈—S—(CH₂)₈Si(OEt)₃,
(EtO)₃Si—(CH₂)₉—S—(CH₂)₁Si(OEt)₃,
(EtO)₃Si—(CH₂)₁₀—S—(CH₂)₁₀Si(OEt)₃, Especially preferred are the silanes of the formula II
(EtO)₃Si—(CH₂)₃—S—(CH₂)₆—S—(CH₂)₃—Si(OEt)₃, (EtO)₃Si—(CH₂)₈—Si(OEt)₃ and (EtO)₃Si—(CH₂)₃—S—(CH₂)₃Si(OEt)₃

Very particular preference is given to a silane mixture of (EtO)₃Si—(CH₂)₃—SH and (EtO)₃Si—(CH₂)₃—S—(CH₂)₆—S—(CH₂)₃—Si(OEt)₃, (EtO)₃Si—(CH₂)₈—Si(OEt)₃ or (EtO)₃Si—(CH₂)₃—S—(CH₂)₃Si(OEt)₃.

Exceptional preference is given to a silane mixture of (EtO)₃Si—(CH₂)₃—SH and (EtO)₃Si—(CH₂)₃—S—(CH₂)₆—S—(CH₂)₃—Si(OEt)₃ or (EtO)₃Si—(CH₂)₃—Si(OEt)₃.

The present invention further provides a process for preparing the silane mixture according to the invention, which is characterized in that the silane of the formula I

and a silane of the formula II

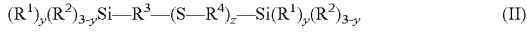

where R¹, R², R³, R⁴, y and z have the definition given above are mixed in a molar ratio of 20:80-85:15, preferably 30:70-85:15, more preferably 40:60-85:15, most preferably 50:50-85:15.

Preferably, a silane of the formula I

and a silane of the formula II

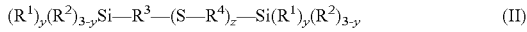

where R¹, R², R³, R⁴ and y have the definition given above and z=0 or 2, more preferably 0, can be mixed.

The process according to the invention can be conducted with exclusion of air. The process according to the invention can be conducted under protective gas atmosphere, for example under argon or nitrogen, preferably under nitrogen.

The process according to the invention can be conducted at standard pressure, elevated pressure or reduced pressure. Preferably, the process according to the invention can be conducted at standard pressure.

Elevated pressure may be a pressure of 1.1 bar to 100 bar, preferably of 1.1 bar to 50 bar, more preferably of 1.1 bar to 10 bar and very preferably of 1.1 to 5 bar.

Reduced pressure may be a pressure of 1 mbar to 1000 mbar, preferably 250 mbar to 1000 mbar, more preferably 500 mbar to 1000 mbar.

The process according to the invention can be conducted between 20° C. and 100° C., preferably between 20° C. and 50° C., more preferably between 20° C. and 30° C.

The process according to the invention can be conducted in a solvent, for example methanol, ethanol, propanol, butanol, cyclohexanol, N,N-dimethylformamide, dimethyl sulfoxide, pentane, hexane, cyclohexane, heptane, octane, decane, toluene, xylene, acetone, acetonitrile, carbon tetrachloride, chloroform, dichloromethane, 1,2-dichloroethane, tetrachloroethylene, diethyl ether, methyl tert-butyl ether, methyl ethyl ketone, tetrahydrofuran, dioxane, pyridine or methyl acetate, or a mixture of the aforementioned solvents. The process according to the invention can preferably be conducted without solvent.

The silane mixture according to the invention can be used as adhesion promoter between inorganic materials, for example glass beads, glass flakes, glass surfaces, glass fibres, or oxidic fillers, preferably silicas such as precipitated silicas and fumed silicas, and organic polymers, for example thermosets, thermoplastics or elastomers, or as crosslinking agents and surface modifiers for oxidic surfaces.

The silane mixture according to the invention can be used as coupling reagents in filled rubber mixtures, examples being tyre treads, industrial rubber articles or footwear soles.

Advantages of the silane mixtures according to the invention are improved rolling resistance, higher reinforcement and lower abrasion in rubber mixtures.

EXAMPLES

NMR method: The molar ratios and proportions by mass reported as analysis results in the examples come from ¹³C NMR measurements with the following indices: 100.6 MHz, 1000 scans, solvent: CDCl₃, internal standard for calibration: tetramethylsilane, relaxation aid: Cr(acac)₃; for the determination of the proportion by mass in the product, a defined amount of dimethyl sulfone is added as internal standard and the molar ratios of the products are used to calculate the proportion by mass.

Comparative Example 1 bis(triethoxysilylpropyl) disulfide from Evonik Industries AG.

Comparative Example 2

3-octanoylthio-1-propyltriethoxysilane, NXT Silane from Momentive Performance Materials.

Comparative Example 3

(3-mercaptopropyl)triethoxysilane.

Comparative Example 4 bistriethoxysilyloctane from ABCR GmbH.

Comparative Example 5: bis(triethoxysilylpropyl) Sulfide

To a solution of chloropropyltriethoxysilane (361 g; 1.5 mol; 1.92 eq) in ethanol (360 ml) was added $Na_2S$ (61.5 g; 0.78 mol; 1.00 eq) in portions at such a rate as to not exceed 60° C. Completion of addition was followed by heating at reflux for 3 h, before leaving to cool to room temperature. The reaction product was freed of precipitated salts by filtration. By distillative purification (0.04 mbar; 110° C.), the product (yield: 73%, purity: >99% by $^{13}C$ NMR) was obtained as a clear liquid.

Comparative Example 6: 1,6-bis(thiopropyltriethoxysilyl)hexane

Sodium ethoxide (21% in EtOH; 82.3 g; 0.254 mol; 2.05 eq) was metered into mercaptopropyltriethoxysilane (62.0 g; 0.260 mol; 2.10 eq) at such a rate that the reaction temperature did not exceed 35° C. On completion of addition, the mixture was heated at reflux for 2 h. Then the reaction mixture was added to 1,6-dichlorohexane (19.2 g; 0.124 mol; 1.00 eq) at 80° C. over the course of 1.5 h. On completion of addition, the mixture was heated at reflux for 3 h and then allowed to cool down to room temperature. Precipitated salts were filtered off and the product was freed of the solvent under reduced pressure. The product (yield: 88%, purity: >99% in $^{13}C$ NMR) was obtained as a clear liquid.

Comparative Example 7

6.84 parts by weight of Comparative Example 1 together with 2.65 parts by weight of Comparative Example 5 were weighed into a flat PE bag and mixed. This mixture corresponds to a molar ratio: 71% $(EtO)_3Si(CH_2)_3S_2(CH_2)_3Si(OEt)_3$ and 29% $(EtO)_3Si(CH_2)_3S(CH_2)_3Si(OEt)_3$.

Comparative Example 8

6.84 parts by weight of Comparative Example 1 together with 3.65 parts by weight of Comparative Example 5 were weighed into a flat PE bag and mixed. This mixture corresponds to a molar ratio: 64% $(EtO)_3Si(CH_2)_3S_2(CH_2)_3Si(OEt)_3$ and 36% $(EtO)_3Si(CH_2)_3S(CH_2)_3Si(OEt)_3$.

Comparative Example 9

6.84 parts by weight of Comparative Example 1 together with 4.87 parts by weight of Comparative Example 5 were weighed into a flat PE bag and mixed. This mixture corresponds to a molar ratio: 57% $(EtO)_3Si(CH_2)_3S_2(CH_2)_3Si(OEt)_3$ and 43% $(EtO)_3Si(CH_2)_3S(CH_2)_3Si(OEt)_3$.

Comparative Example 10

6.84 parts by weight of Comparative Example 2 together with 2.10 parts by weight of Comparative Example 6 were weighed into a flat PE bag and mixed. This mixture corresponds to a molar ratio: 83% $(EtO)_3Si(CH_2)_3SCO(CH_2)_6CH_3$ and 17% $(EtO)_3Si(CH_2)_3S(CH_2)_6S(CH_2)_3Si(OEt)_3$.

Comparative Example 11

6.84 parts by weight of Comparative Example 2 together with 3.15 parts by weight of Comparative Example 6 were weighed into a flat PE bag and mixed. This mixture corresponds to a molar ratio: 77% $(EtO)_3Si(CH_2)_3SCO(CH_2)_6CH_3$ and 23% $(EtO)_3Si(CH_2)_3S(CH_2)_6S(CH_2)_3Si(OEt)_3$.

Comparative Example 12

6.84 parts by weight of Comparative Example 2 together with 4.20 parts by weight of Comparative Example 6 were weighed into a flat PE bag and mixed. This mixture corresponds to a molar ratio: 71% $(EtO)_3Si(CH_2)_3SCO(CH_2)_6CH_3$ and 29% $(EtO)_3Si(CH_2)_3S(CH_2)_6S(CH_2)_3Si(OEt)_3$.

Comparative Example 13

6.84 parts by weight of Comparative Example 2 together with 1.65 parts by weight of Comparative Example 4 were weighed into a flat PE bag and mixed. This mixture corresponds to a molar ratio: 83% $(EtO)_3Si(CH_2)_3SCO(CH_2)_6CH_3$ and 17% $(EtO)_3Si(CH_2)_8Si(OEt)_3$.

Comparative Example 14

6.84 parts by weight of Comparative Example 2 together with 2.47 parts by weight of Comparative Example 4 were weighed into a flat PE bag and mixed. This mixture corresponds to a molar ratio: 77% $(EtO)_3Si(CH_2)_3SCO(CH_2)_6CH_3$ and 23% $(EtO)_3Si(CH_2)_8Si(OEt)_3$.

Comparative Example 15

6.84 parts by weight of Comparative Example 2 together with 3.29 parts by weight of Comparative Example 4 were weighed into a flat PE bag and mixed. This mixture corresponds to a molar ratio: 71% $(EtO)_3Si(CH_2)_3SCO(CH_2)_6CH_3$ and 29% $(EtO)_3Si(CH_2)_8Si(OEt)_3$.

Example 1

6.84 parts by weight of Comparative Example 3 together with 3.21 parts by weight of Comparative Example 6 were weighed into a flat PE bag and mixed. This mixture corresponds to a molar ratio: 83% $(EtO)_3Si(CH_2)_3SH$ and 17% $(EtO)_3Si(CH_2)_3S(CH_2)_6S(CH_2)_3Si(OEt)_3$.

Example 2

6.84 parts by weight of Comparative Example 3 together with 4.81 parts by weight of Comparative Example 6 were weighed into a flat PE bag and mixed. This mixture corresponds to a molar ratio: 77% $(EtO)_3Si(CH_2)_3SH$ and 23% $(EtO)_3Si(CH_2)_3S(CH_2)_6S(CH_2)_3Si(OEt)_3$.

Example 3

6.84 parts by weight of Comparative Example 3 together with 2.52 parts by weight of Comparative Example 4 were weighed into a flat PE bag and mixed. This mixture corresponds to a molar ratio: 83% (EtO)$_3$Si(CH$_2$)$_3$SH and 17% (EtO)$_3$Si(CH$_2$)$_8$Si(OEt)$_3$.

Example 4

6.84 parts by weight of Comparative Example 3 together with 3.78 parts by weight of Comparative Example 4 were weighed into a flat PE bag and mixed. This mixture corresponds to a molar ratio: 77% (EtO)$_3$Si(CH$_2$)$_3$SH and 23% (EtO)$_3$Si(CH$_2$)$_8$Si(OEt)$_3$.

Example 5

6.84 parts by weight of Comparative Example 3 together with 2.54 parts by weight of Comparative Example 5 were weighed into a flat PE bag and mixed. This mixture corresponds to a molar ratio: 83% (EtO)$_3$Si(CH$_2$)$_3$SH and 17% (EtO)$_3$Si(CH$_2$)$_3$S(CH$_2$)$_3$Si(OEt)$_3$.

Example 6

6.84 parts by weight of Comparative Example 3 together with 3.81 parts by weight of Comparative Example 5 were weighed into a flat PE bag and mixed. This mixture corresponds to a molar ratio: 77% (EtO)$_3$Si(CH$_2$)$_3$SH and 23% (EtO)$_3$Si(CH$_2$)$_3$S(CH$_2$)$_3$Si(OEt)$_3$.

Example 7: Rubber Tests

The formulation used for the rubber mixtures is specified in Table 1 below. The unit phr means parts by weight based on 100 parts of the raw rubber used. The silane mixtures all contain an identical phr amount of silane of the formula I which reacts with the rubber during the vulcanization and different phr amounts of the silane of the formula II.

TABLE 1

| | Mixture 1/ phr | Mixture 2/ phr | Mixture 3/ phr | Mixture 4/ phr | Mixture 5/ phr | Mixture 6/ phr | Mixture 7/ phr | Mixture 8/ phr |
|---|---|---|---|---|---|---|---|---|
| 1st stage | | | | | | | | |
| NR[a)] | 10.0 | 10.0 | 10.0 | 10.0 | 10.0 | 10.0 | 10.0 | 10.0 |
| BR[b)] | 18.0 | 18.0 | 18.0 | 18.0 | 18.0 | 18.0 | 18.0 | 18.0 |
| S-SBR[c)] | 72.0 | 72.0 | 72.0 | 72.0 | 72.0 | 72.0 | 72.0 | 72.0 |
| Silica[d)] | 95.0 | 95.0 | 95.0 | 95.0 | 95.0 | 95.0 | 95.0 | 95.0 |
| TDAE oil[e)] | 50.0 | 50.0 | 50.0 | 50.0 | 50.0 | 50.0 | 50.0 | 50.0 |
| 6PPD[f)] | 2.0 | 2.0 | 2.0 | 2.0 | 2.0 | 2.0 | 2.0 | 2.0 |
| Antiozonant wax | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 |
| Comp. Ex. 1 | 6.8 | | | | | | | |
| Comp. Ex. 7 | | 9.5 | | | | | | |
| Comp. Ex. 8 | | | 10.5 | | | | | |
| Comp. Ex. 9 | | | | 11.7 | | | | |
| Comp. Ex. 5 | | | | | 6.1 | | | |
| Comp. Ex. 2 | | | | | | 6.8 | | |
| Comp. Ex. 10 | | | | | | | 8.9 | |
| Comp. Ex. 11 | | | | | | | | 10.0 |
| Comp. Ex. 12 | | | | | | | | |
| Comp. Ex. 13 | | | | | | | | |
| Comp. Ex. 14 | | | | | | | | |
| Comp. Ex. 15 | | | | | | | | |
| Comp. Ex. 4 | | | | | | | | |
| Comp. Ex. 3 | | | | | | | | |
| 2nd stage | | | | | | | | |
| Stage 1 batch | | | | | | | | |
| 3rd stage | | | | | | | | |
| Stage 2 batch | | | | | | | | |
| DPG[g)] | 2.0 | 2.0 | 2.0 | 2.0 | 2.0 | 2.0 | 2.0 | 2.0 |
| CBS[h)] | 2.0 | 2.0 | 2.0 | 2.0 | 2.0 | 2.0 | 2.0 | 2.0 |
| Sulfur[i)] | 2.0 | 2.0 | 2.0 | 2.0 | 2.0 | 2.0 | 2.0 | 2.0 |

| | Mixture 9/ phr | Mixture 10/ phr | Mixture 11/ phr | Mixture 12/ phr | Mixture 13/ phr | Mixture 14/ phr |
|---|---|---|---|---|---|---|
| 1st stage | | | | | | |
| NR[a)] | 10.0 | 10.0 | 10.0 | 10.0 | 10.0 | 10.0 |
| BR[b)] | 18.0 | 18.0 | 18.0 | 18.0 | 18.0 | 18.0 |
| S-SBR[c)] | 72.0 | 72.0 | 72.0 | 72.0 | 72.0 | 72.0 |
| Silica[d)] | 95.0 | 95.0 | 95.0 | 95.0 | 95.0 | 95.0 |
| TDAE oil[e)] | 50.0 | 50.0 | 50.0 | 50.0 | 50.0 | 50.0 |
| 6PPD[f)] | 2.0 | 2.0 | 2.0 | 2.0 | 2.0 | 2.0 |
| Antiozonant wax | 2.0 | 2.0 | 2.0 | 2.0 | 2.0 | 2.0 |
| Zinc oxide | 2.5 | 2.5 | 2.5 | 2.5 | 2.5 | 2.5 |
| Stearic acid | 2.5 | 2.5 | 2.5 | 2.5 | 2.5 | 2.5 |
| Comp. Ex. 1 | | | | | | |
| Comp. Ex. 7 | | | | | | |
| Comp. Ex. 8 | | | | | | |
| Comp. Ex. 9 | | | | | | |
| Comp. Ex. 5 | | | | | | |

TABLE 1-continued

| | | | | | | | |
|---|---|---|---|---|---|---|---|
| Comp. Ex. 2 | | | | | | | |
| Comp. Ex. 10 | | | | | | | |
| Comp. Ex. 11 | | | | | | | |
| Comp. Ex. 12 | 11.0 | | | | | | |
| Comp. Ex. 13 | | 8.5 | | | | | |
| Comp. Ex. 14 | | | 9.3 | | | | |
| Comp. Ex. 15 | | | | 10.1 | | | |
| Comp. Ex. 4 | | | | | 6.8 | | |
| Comp. Ex. 3 | | | | | | 6.8 | |
| 2nd stage | | | | | | | |
| Stage 1 batch | | | | | | | |
| 3rd stage | | | | | | | |
| Stage 2 batch | | | | | | | |
| DPG$^{g)}$ | 2.0 | 2.0 | 2.0 | 2.0 | 2.0 | 2.0 | |
| CBS$^{h)}$ | 2.0 | 2.0 | 2.0 | 2.0 | 2.0 | 2.0 | |
| Sulfur$^{i)}$ | 2.0 | 2.0 | 2.0 | 2.0 | 2.0 | 2.0 | |

| | Mixture 15/ phr | Mixture 16/ phr | Mixture 17/ phr Inv. | Mixture 18/ phr Inv. | Mixture 19/ phr Inv. | Mixture 20/ phr Inv. | Mixture 21/ phr Inv. | Mixture 22/ phr Inv. |
|---|---|---|---|---|---|---|---|---|
| 1st stage | | | | | | | | |
| NR$^{a)}$ | 10.0 | 10.0 | 10.0 | 10.0 | 10.0 | 10.0 | 10.0 | 10.0 |
| BR$^{b)}$ | 18.0 | 18.0 | 18.0 | 18.0 | 18.0 | 18.0 | 18.0 | 18.0 |
| S-SBR$^{c)}$ | 72.0 | 72.0 | 72.0 | 72.0 | 72.0 | 72.0 | 72.0 | 72.0 |
| Silica$^{d)}$ | 95.0 | 95.0 | 95.0 | 95.0 | 95.0 | 95.0 | 95.0 | 95.0 |
| TDAE oil$^{e)}$ | 50.0 | 50.0 | 50.0 | 50.0 | 50.0 | 50.0 | 50.0 | 50.0 |
| 6PPD$^{f)}$ | 2.0 | 2.0 | 2.0 | 2.0 | 2.0 | 2.0 | 2.0 | 2.0 |
| Antiozonant wax | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 |
| Comp. Ex. 5 | 6.8 | | | | | | | |
| Comp. Ex. 6 | | 8.1 | | | | | | |
| Example 1 | | | 10.1 | | | | | |
| Example 2 | | | | 11.7 | | | | |
| Example 3 | | | | | 9.4 | | | |
| Example 4 | | | | | | 10.6 | | |
| Example 5 | | | | | | | 9.4 | |
| Example 6 | | | | | | | | 10.7 |
| 2nd stage | | | | | | | | |
| Stage 1 batch | | | | | | | | |
| 3rd stage | | | | | | | | |
| Stage 2 batch | | | | | | | | |
| DPG$^{g)}$ | 2.0 | 2.0 | 2.0 | 2.0 | 2.0 | 2.0 | 2.0 | 2.0 |
| CBS$^{h)}$ | 2.0 | 2.0 | 2.0 | 2.0 | 2.0 | 2.0 | 2.0 | 2.0 |
| Sulfur$^{i)}$ | 2.0 | 2.0 | 2.0 | 2.0 | 2.0 | 2.0 | 2.0 | 2.0 |

Substances used:
$^{a)}$NR TSR: natural rubber (TSR = technically specified rubber).
$^{b)}$Europrene Neocis BR 40, from Polimeri.
$^{c)}$S-SBR: Sprintan ® SLR-4601, from Trinseo.
$^{d)}$Silica: ULTRASIL ® VN 3 GR from Evonik Industries AG (precipitated silica, BET surface area = 175 m$^2$/g).
$^{e)}$TDAE oil: TDAE = treated distillate aromatic extract.
$^{f)}$6PPD: N-(1,3-dimethylbutyl)-N'-phenyl-p-phenylenediamine (6PPD).
$^{g)}$DPG: N,N'-diphenylguanidine (DPG).
$^{h)}$CBS: N-cyclohexyl-2-benzothiazolesulfenamide.
$^{i)}$Sulfur: ground sulfur.

The mixture was produced by processes customary in the rubber industry in three stages in a laboratory mixer of capacity 300 millilitres to 3 litres, by first mixing, in the first mixing stage (base mixing stage), all the constituents apart from the vulcanization system (sulfur and vulcanization-influencing substances) at 145 to 165° C., target temperatures of 152 to 157° C., for 200 to 600 seconds. In the second stage, the mixture from stage 1 was thoroughly mixed once more, performing what is called a remill. Addition of the vulcanization system in the third stage (ready-mix stage) produced the finished mixture, with mixing at 90 to 120° C. for 180 to 300 seconds. All the mixtures were used to produce test specimens by vulcanization under pressure at 160° C.-170° C. after t95-t100 (measured on a moving disc rheometer to ASTM D 5289-12/ISO 6502).

The general process for producing rubber mixtures and vulcanizates thereof is described in "Rubber Technology Handbook", W. Hofmann, Hanser Verlag 1994.

Rubber testing was effected in accordance with the test methods specified in Table 2. The results of the rubber testing are reported in Table 3.

TABLE 2

| Physical testing | Standard/conditions |
|---|---|
| Viscoelastic properties of the vulcanizate at 70° C., strain sweep, 1 Hz, 1%-100% elongation Loss factor tan δ at 10% elongation | RPA (rubber process analyzer) in accordance with ASTM D6601, values recorded during the second strain sweep |

TABLE 2-continued

| Physical testing | Standard/conditions |
| --- | --- |
| Viscoelastic properties of the vulcanizate at 55° C. Maximum loss factor tan δ Resilience at 70° C. | from dynamic-mechanical measurement according to DIN 53 513, strain sweep |
| Resilience/% | according to ISO 4662 |
| Tensile test at 23° C. Stress value at 200% elongation/MPa | according to DIN 53 504 |
| Abrasion, 10 N at 23° C. Abrasion/mm³ | determined with an instrument having a rotating cylinder drum, loss of volume reported according to ISO 4649 |

TABLE 3

|  | Mixture 1 | Mixture 2 | Mixture 3 | Mixture 4 | Mixture 5 | Mixture 6 |
| --- | --- | --- | --- | --- | --- | --- |
| tan δ (10%) at 70° C. | 0.188 | 0.190 | 0.186 | 0.186 | 0.213 | 0.177 |
| Maximum tan δ at 55° C. | 0.174 | 0.168 | 0.169 | 0.164 | 0.207 | 0.179 |
| Resilience/% | 44.0 | 46.2 | 48.3 | 48.8 | 40.9 | 45.1 |
| 200% modulus/MPa | 4.5 | 5.0 | 5.2 | 5.3 | 2.9 | 4.5 |
| Abrasion/mm³ | 146 | 147 | 146 | 159 | 215 | 133 |

|  | Mixture 7 | Mixture 8 | Mixture 9 | Mixture 10 | Mixture 11 | Mixture 12 |
| --- | --- | --- | --- | --- | --- | --- |
| tan δ (10%) at 70° C. | 0.171 | 0.171 | 0.169 | 0.238 | 0.236 | 0.235 |
| Maximum tan δ at 55° C. | 0.172 | 0.168 | 0.166 | 0.210 | 0.217 | 0.205 |
| Resilience/% | 47.5 | 49.1 | 49.3 | 38.6 | 38.4 | 39.2 |
| 200% modulus/MPa | 4.7 | 4.9 | 5.0 | 1.8 | 1.8 | 1.8 |
| Abrasion/mm³ | 134 | 143 | 143 | 282 | 287 | 268 |

|  | Mixture 13 | Mixture 14 | Mixture 15 | Mixture 16 |
| --- | --- | --- | --- | --- |
| tan δ (10%) at 70° C. | 0.275 | 0.174 | 0.240 | 0.174 |
| Maximum tan δ at 55° C. | 0.218 | 0.176 | 0.209 | 0.192 |
| Resilience/% | 31.7 | 46.6 | 34.2 | 42.1 |
| 200% modulus/MPa | 1.1 | 4.4 | 1.4 | 2.5 |
| Abrasion/mm³ | 320 | 99 | 234 | 196 |

|  | Mixture 17 Inv. | Mixture 18 Inv. | Mixture 19 Inv. | Mixture 20 Inv. | Mixture 21 Inv. | Mixture 22 Inv. |
| --- | --- | --- | --- | --- | --- | --- |
| tan δ (10%) at 70° C. | 0.144 | 0.149 | 0.148 | 0.141 | 0.155 | 0.152 |
| Maximum tan δ at 55° C. | 0.140 | 0.139 | 0.153 | 0.138 | 0.154 | 0.144 |
| Resilience/% | 52.9 | 54.7 | 51.9 | 53.7 | 51.5 | 52.9 |
| 200% modulus/MPa | 5.9 | 6.3 | 7.1 | 7.6 | 6.1 | 6.4 |
| Abrasion/mm³ | 81 | 86 | 67 | 76 | 72 | 85 |

Compared to the comparative mixtures, the mixtures according to the invention feature advantages in rolling resistance (tan δ measurements, resilience at 7000). Abrasion and reinforcement of the mixtures according to the invention are likewise improved compared to the prior art (abrasion, 200% modulus).

The invention claimed is:

1. A silane mixture comprising:
a silane of formula I $$(R^1)_y(R^2)_{3-y}Si—R^3—SH \quad (I)$$

and
a silane of formula II $$(R^1)_y(R^2)_{3-y}Si—R^3—(S—R^4)_z—Si(R^1)_y(R^2)_{3-y} \quad (II)$$

wherein
$R^1$ are each independently a C1-C10-alkoxy group, a phenoxy group, a C4-C10-cycloalkoxy group or an alkyl polyether group —O—$(R^5$—O$)_r$—$R^6$ wherein $R^5$ are each independently a branched or unbranched, saturated or unsaturated, aliphatic, aromatic or mixed aliphatic/aromatic divalent C1-C30 hydrocarbon group, r is an integer from 1 to 30 and $R^6$ is unsubstituted or substituted, branched or unbranched monovalent alkyl, alkenyl, aryl or aralkyl group, $R^2$ are each independently a C6-C20-aryl group, a C1-C10-alkyl group, a C2-C20-alkenyl group, a C7-C20-aralkyl group or halogen, $R^3$ are each independently a branched or unbranched, saturated or unsaturated, aliphatic, aromatic or mixed aliphatic/aromatic divalent C1-C30 hydrocarbon group, $R^4$ are each independently a branched or unbranched, saturated or unsaturated, aliphatic, aromatic or mixed aliphatic/aromatic: divalent C1-C30 hydrocarbon group, and y are each independently 1, 2 or 3, z is 2 or 3, and the molar ratio of the silane of formula I to the silane of formula II is from 20:80 to 85:15.

2. The silane mixture according to claim 1, wherein z is 2.

3. The silane mixture according to claim 1, wherein the silane of the formula I is $(EtO)_3Si—(CH_2)_3—SH$ and the silane of the formula II is $(EtO)_3—Si—(CH_2)_3—S—(CH_2)_6—S—(CH_2)_3—Si(OEt)_3$, $(EtO)_3Si—(CH_2)_3—Si(OEt)_3$ or $(EtO)_3Si—(CH_2)_3—S—(CH_2)_3Si(OEt)_3$.

4. The silane mixture according to claim 1, wherein the molar ratio of silane of the formula I to silane of the formula II is 50:50-85:15.

5. A process for preparing a silane mixture according to claim 1, wherein the silane of formula I $$(R^1)_y(R^2)_{3-y}Si—R^3—SH \quad (I)$$

and the silane of formula II $$(R^1)_y(R^2)_{3-y}Si—R^3—(S—R^4)_z—Si(R^1)_y(R^2)_{3-y} \quad (II)$$

are mixed in a molar ratio of 20:80-85:15.

6. The process for preparing a silane mixture according to claim 5, wherein z=2.

7. The process for preparing a silane mixture according to claim 5, wherein the molar ratio of the silane of formula I to the silane of formula II is from 50:50 to 85:15.

8. The process for preparing a silane mixture according to claim 7, wherein the silane of formula I is $(EtO)_3Si—(CH_2)_3—SH$ and the silane of formula II is $(EtO)_3Si—(CH_2)_3—S—(CH_2)_6—S—(CH_2)_3—Si(OEt)_3$, $(EtO)_3Si—(CH_2)_8—Si(OEt)_3$ or $(EtO)_3Si—(CH_2)_3—S—(CH_2)_3Si(OEt)_3$.

* * * * *